United States Patent
Ishikawa et al.

(10) Patent No.: US 9,128,330 B2
(45) Date of Patent: Sep. 8, 2015

(54) LIQUID CRYSTAL DISPLAY DEVICE AND METHOD OF MANUFACTURING THE SAME

(71) Applicant: Japan Display Inc., Tokyo (JP)

(72) Inventors: Tomokazu Ishikawa, Mobara (JP); Masato Shimura, Mobara (JP)

(73) Assignee: Japan Display Inc., Tokyo (JP)

( * ) Notice: Subject to any disclaimer, the term of this patent is extended or adjusted under 35 U.S.C. 154(b) by 127 days.

(21) Appl. No.: 13/957,474

(22) Filed: Aug. 2, 2013

(65) Prior Publication Data

US 2014/0036212 A1    Feb. 6, 2014

(30) Foreign Application Priority Data

Aug. 3, 2012 (JP) ................... 2012-173102

(51) Int. Cl.
    *G02F 1/1339* (2006.01)
(52) U.S. Cl.
    CPC .................... *G02F 1/1339* (2013.01)
(58) Field of Classification Search
    USPC ......................................... 349/153–155, 190
    See application file for complete search history.

(56) References Cited

U.S. PATENT DOCUMENTS

| | | | |
|---|---|---|---|
| 6,504,592 B1 * | 1/2003 | Takatori et al. | 349/129 |
| 6,888,608 B2 * | 5/2005 | Miyazaki et al. | 349/156 |
| 7,088,418 B1 | 8/2006 | Yamashita et al. | |
| 2008/0116469 A1 * | 5/2008 | Weng et al. | 257/89 |
| 2008/0129946 A1 * | 6/2008 | Chan et al. | 349/153 |
| 2010/0045922 A1 * | 2/2010 | Motomatsu | 349/156 |

FOREIGN PATENT DOCUMENTS

JP    2001-51282    2/2001

* cited by examiner

*Primary Examiner* — Hoan C Nguyen
(74) *Attorney, Agent, or Firm* — Lowe Hauptman & Ham, LLP

(57) ABSTRACT

A liquid crystal display device includes a bank on a first substrate and surrounding an image display area, a first alignment film on the first substrate, a second alignment film on a second substrate, and a sealing member to seal the liquid crystal material between the first and the second alignment films. The bank has a shape in which a slope of an inside surface standing from an inner peripheral lower end on a side of the image display area is steeper than a slope of an outside surface standing from an outer peripheral lower end on an opposite side to the image display area. The first alignment film contacts the inside surface of the bank and is provided in the image display area. The sealing member passes over the outside surface of the bank in a direction toward the inside surface and overlaps the bank.

16 Claims, 4 Drawing Sheets

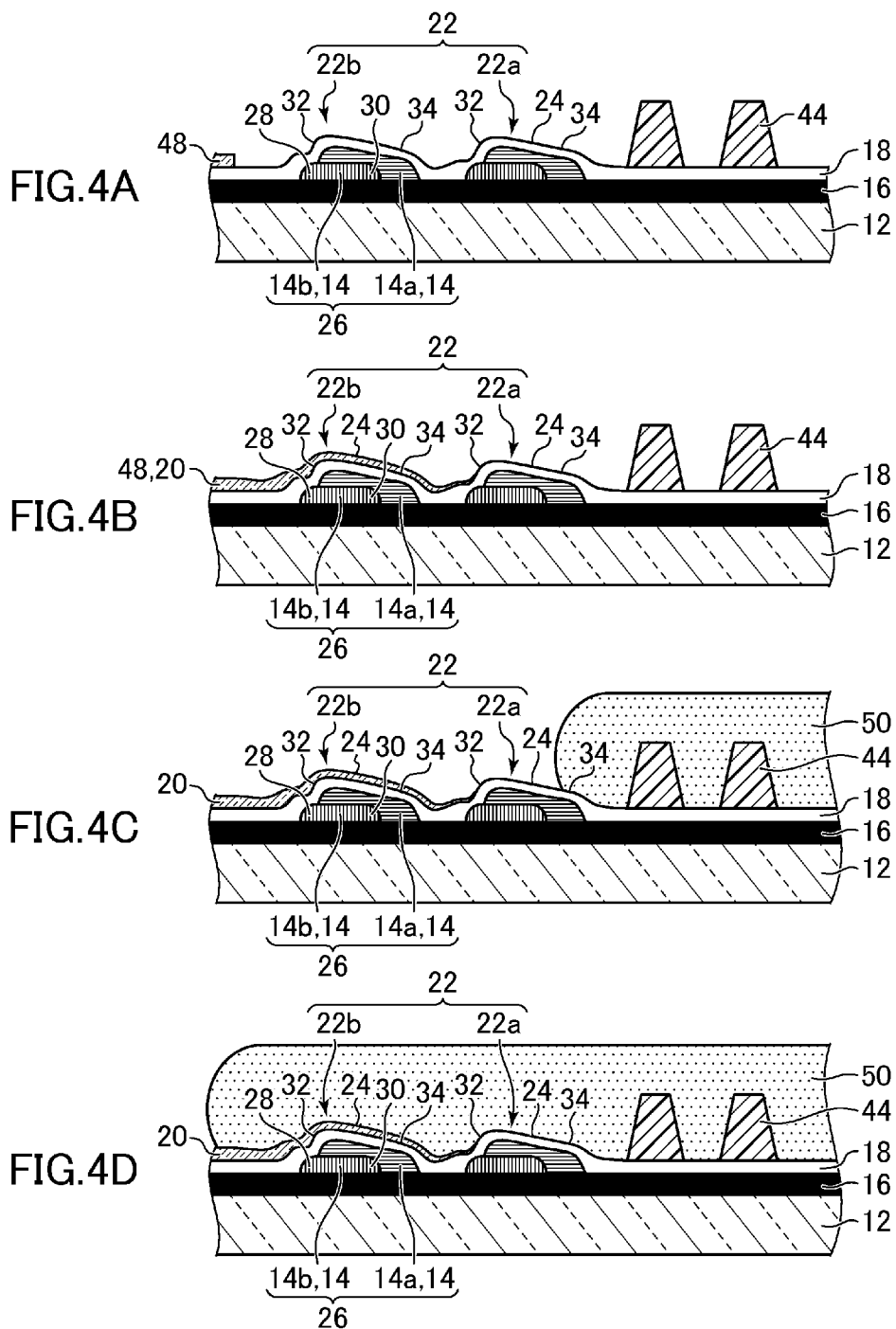

LIQUID CRYSTAL DISPLAY DEVICE AND METHOD OF MANUFACTURING THE SAME

CROSS-REFERENCE TO RELATED APPLICATION

The present application claims priority from Japanese application JP2012-173102 filed on Aug. 3, 2012, the content of which is hereby incorporated by reference into this application.

BACKGROUND OF THE INVENTION

1. Field of the Invention

The present invention relates to a liquid crystal display device and a manufacturing method of the same.

2. Description of the Related Art

In a liquid crystal display panel, liquid crystal material is provided between a pair of substrates, and an alignment film is formed on each of facing surfaces of the pair of substrates. The liquid crystal material is sealed by a sealing member between the pair of substrates (JP 2001-51282A). The alignment film and the sealing member are respectively made of resin solution.

Hitherto, when the alignment film is formed, a bank is disposed in order to control the spread of the resin solution to the outside. The bank is disposed in an area called a frame positioned outside an image display area of the liquid crystal display panel, and in the frame, the sealing member is disposed outside the bank. In recent years, since the frame becomes narrow, the bank and the sealing member overlap each other. Since the spread of the sealing member forming resin solution to the inside is dammed by the bank, the resin solution spreads to the outside. Thus, the sealing member is formed outside a predetermined position, and if the sealing member reaches a cut line, the sealing member, together with the substrate, is cut. Since the hard substrate and the soft sealing member are simultaneously cut, defective cutting occurs.

SUMMARY OF THE INVENTION

An object of the invention is to suppress the spread of an alignment film to the outside while the spread of a sealing member to the inside is not hindered.

(1) According to an aspect of the invention, a liquid crystal display device includes a first substrate including an image display area, a bank provided on the first substrate and surrounding the image display area, a first alignment film provided on the first substrate, a second substrate, a second alignment film provided on the second substrate, a liquid crystal material sandwiched between the first alignment film and the second alignment film, and a sealing member to seal the liquid crystal material between the first alignment film and the second alignment film, the bank has a shape in which a slope of an inside surface standing from an inner peripheral lower end on a side of the image display area is steeper than a slope of an outside surface standing from an outer peripheral lower end on an opposite side to the image display area, the first alignment film contacts the inside surface of the bank and is provided in the image display area, and the sealing member passes over the outside surface of the bank in a direction toward the inside surface and overlaps the bank. According to the invention, in the bank, the slope of the inside surface is steep and the slope of the outside surface is gentle. Accordingly, the first alignment film is dammed by the bank, and the sealing member can be spread in the inside direction so as to be placed on the bank.

(2) In the liquid crystal display device recited in (1), a difference in height of the inside surface of the bank is larger than that of the outside surface.

(3) In the liquid crystal display device recited in (2), the inside surface is step-shaped.

(4) In the liquid crystal display device recited in any one of (1) to (3), the bank includes plural banks different in size, a bank having a small outer periphery is positioned inside a bank having a large outer periphery, the first alignment film contacts at least the inside surface of the smallest bank, and the sealing member passes over at least the outside surface of the largest bank.

(5) In the liquid crystal display device recited in any one of (1) to (4), the sealing member overlaps the first alignment film over the bank.

(6) In the liquid crystal display device recited in any one of (1) to (5), the bank includes a protruding part provided on a surface of a layer provided on the first substrate.

(7) In the liquid crystal display device recited in (6), the protruding part is provided along a surface shape of an underlayer disposed under the layer.

(8) In the liquid crystal display device recited in (7), colored layers of plural colors are provided on the first substrate, the colored layers of plural colors constitute a color filter in the image display area, and at least one of the colored layers of plural colors constitutes the underlayer.

(9) In the liquid crystal display device recited in (8), two or more layers of the colored layers of plural colors overlap each other to constitute the underlayer.

In the liquid crystal display device recited in (9), two layers including a first layer and a second layer of the colored layers of plural colors overlap each other to constitute the underlayer, and the first layer is disposed to be placed on an outside area of an outer peripheral end part from a portion on the outer peripheral end part of the second layer on an opposite side to the image display area except for a portion on an inner peripheral end part of the second layer on a side of the image display area.

(11) According to another aspect of the invention, a manufacturing method of a liquid crystal display device includes the steps of forming a first alignment film of a first liquid resin in an image display area of a first substrate on which a bank is formed to surround the image display area, providing a sealing member of a second liquid resin on an outside of the bank of the first substrate, and sealing a liquid crystal material in a space between the first alignment film of the first substrate and a second alignment film of a second substrate and surrounded by the sealing member, in the step of forming the first alignment film, the first liquid resin flows from the image display area toward a direction of the bank, in the step of providing the sealing member, the second liquid resin flows from the outside of the bank toward a direction of the bank, the bank has a shape in which a slope of an inside surface standing from an inner peripheral lower end on a side of the image display area is steeper than a slope of an outside surface standing from an outer peripheral lower end on an opposite side to the image display area, and fluidity of the first liquid resin on the inside surface is lower than fluidity of the second liquid resin on the outside surface. According to the invention, since the bank is such that the slope of the inside surface is steep and the slope of the outside surface is gentle, the first liquid resin is dammed by the bank and the first alignment film is formed, while the second liquid resin spreads in the inside direction so as to be placed on the bank, and the sealing member can be formed.

(12) In the manufacturing method of the liquid crystal display device recited in (11), in the step of forming the first alignment film, the first liquid resin is provided by printing.

BRIEF DESCRIPTION OF THE DRAWINGS

FIGS. 4A to 4D are views for explaining a manufacturing method of the liquid crystal display device of the embodiment of the invention.

DETAILED DESCRIPTION OF THE INVENTION

Hereinafter, an embodiment of the invention will be described with reference to the drawings.

Figure 1:
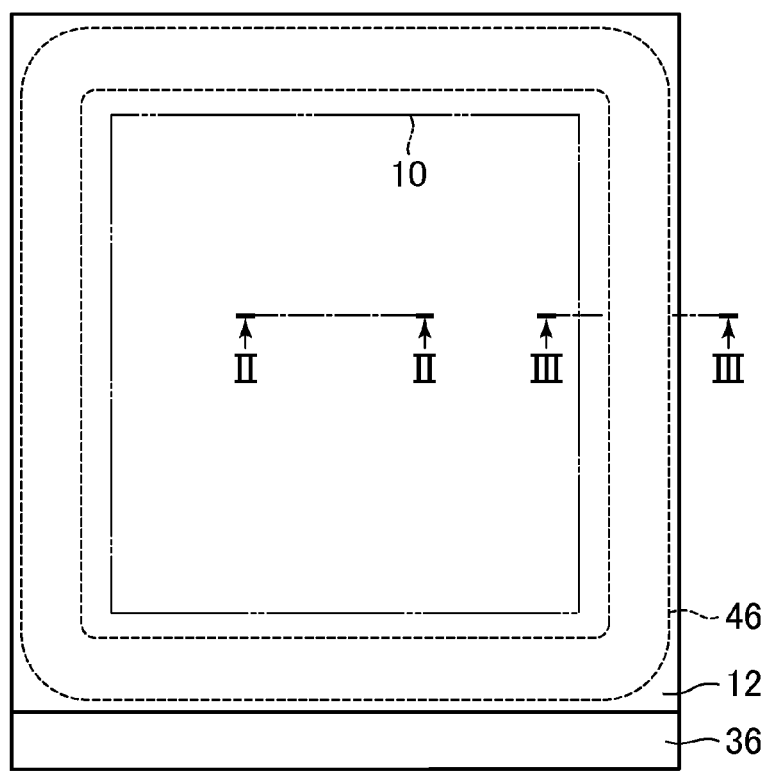
FIG. 1 is a plan view of a liquid crystal display device of an embodiment of the invention.
Figure 2:
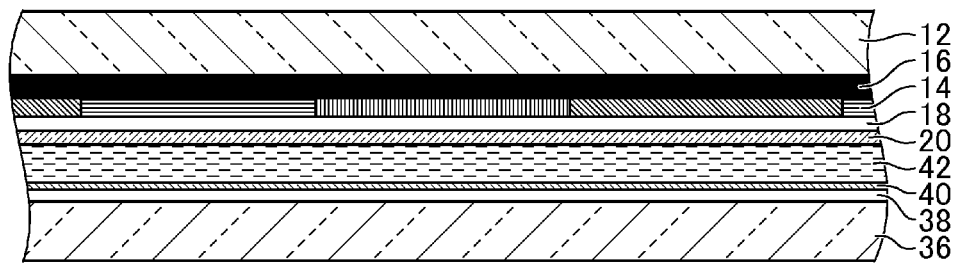
FIG. 2 is an enlarged view of a section of the liquid crystal display device taken along line II-II of FIG. 1.

FIG. 1 is a plan view of a liquid crystal display device of the embodiment of the invention. FIG. 2 is an enlarged view of a section of the liquid crystal display device taken along line II-II of FIG. 1.

The liquid crystal display device includes a first substrate 12 including an image display area 10. The image display area 10 is an area where an image formed of plural pixels is displayed. As shown in FIG. 2, colored layers 14 of plural colors are formed on the first substrate 12. The colored layers 14 of plural colors constitute a color filter in the image display area 10. The respective colored layers 14 are defined by a black matrix 16. The colored layers 14 are covered with an overcoat layer 18. In the image display area 10, a surface of the overcoat layer 18 opposite to the colored layers 14 is flat. A first alignment film 20 is formed on the first substrate 12. In the example of FIG. 2, the first alignment film 20 is disposed on the surface of the overcoat layer 18 opposite to the colored layers 14.

Figure 3:
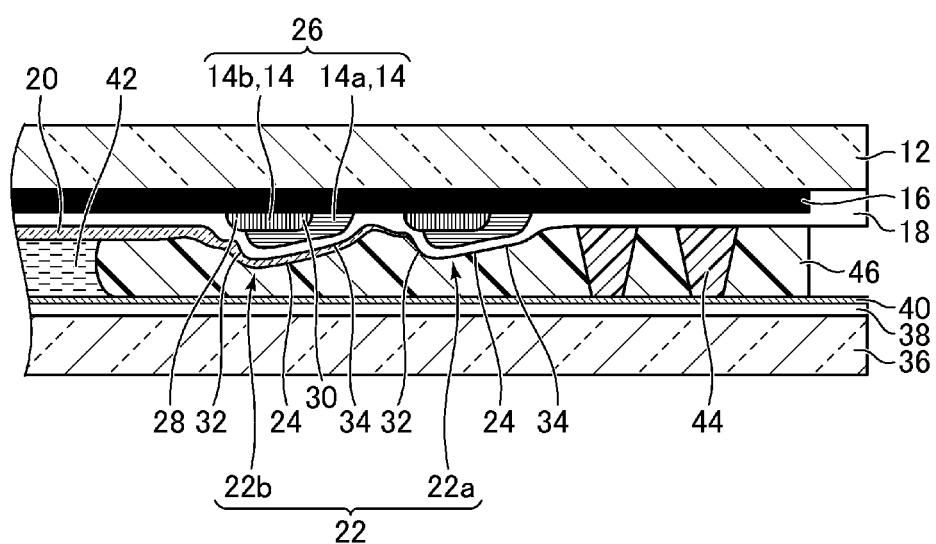
FIG. 3 is an enlarged view of a section of the liquid crystal display device taken along line III-III of FIG. 1.

FIG. 3 is an enlarged view of a section of the liquid crystal display device taken along line III-III of FIG. 1. A bank 22 is provided on the first substrate 12 so as to surround the image display area 10. The bank 22 includes plural banks 22a and 22b different in size, and the bank 22b having a small outer periphery is positioned inside the bank 22a having a large outer periphery. The bank 22 is made of a protruding part 24 formed on the surface of the overcoat layer 18 formed on the first substrate 12. The protruding part 24 is formed along a surface shape of an underlayer 26 disposed under the overcoat layer 18. The underlayer 26 is constructed such that at least one layer or two or more layers of the colored layers 14 of plural colors overlap each other. In the example of FIG. 3, two layers of a first layer 14a and a second layer 14b included in the colored layers 14 of plural colors overlap each other and constitute the underlayer 26. The first layer 14a is disposed except for a portion on an inner peripheral end part 28 of the second layer 14b on a side of the image display area 10. The first layer 14a is disposed to be placed on an outside area of an outer peripheral end part 30 from a portion on the outer peripheral end part 30 of the second layer 14b on an opposite side to the image display area 10.

The bank 22 includes an inside surface 32 standing from an inner peripheral lower end on a side of the image display area 10. The inside surface 32 is step-shaped. The bank 22 includes an outside surface 34 standing from an outer peripheral lower end on an opposite side to the image display area 10. The slope of the inside surface 32 is steeper than that of the outside surface 34. A difference in height of the inside surface 32 of the bank 22 is larger than that of the outside surface 34.

The first alignment film 20 contacts the inside surface 32 of the bank 22 and is formed in the image display area 10. The first alignment film 20 contacts at least the inside surface 32 of the smallest bank 22b.

As shown in FIG. 2, the liquid crystal display device includes a second substrate 36. A circuit layer 38 is formed on the second substrate 36. The circuit layer 38 includes wirings, electrodes, thin film transistors (TFT) and insulating films, which are not shown. A second alignment film 40 is formed on the second substrate 36 so as to cover the circuit layer 38. The liquid crystal display device includes a liquid crystal material 42 sandwiched between the first alignment film 20 and the second alignment film 40. A cell gap between the first substrate 12 and the second substrate 36 is held by a spacer 44. The liquid crystal material 42 is driven by voltage applied to a pixel electrode and a common electrode which are not shown.

As shown in FIG. 3, the liquid crystal display device includes a sealing member 46 to seal the liquid crystal material 42 between the first alignment film 20 and the second alignment film 40. The sealing member 46 passes over the outside surface 34 of the bank 22 in the direction toward the inside surface 32 and overlaps the bank 22. The sealing member 46 passes over the outside surface 34 of at least the largest bank 22a. The sealing member 46 overlaps the first alignment film 20 over the bank 22.

According to the invention, since the slope of the inside surface 32 of the bank 22 is steep and the slope of the outside surface 34 is gentle, the first alignment film 20 is dammed by the bank 22, and the sealing member 46 can be spread in the inside direction so as to be placed on the bank 22.

FIG. 4A to FIG. 4D are views for explaining a manufacturing method of the liquid crystal display device of the embodiment.

As shown in FIG. 4A, the first substrate 12 provided with the bank 22 is prepared. As described above, the bank 22 is disposed so as to surround the image display area 10 shown in FIG. 1. Since the structure thereof is as described above, an explanation thereof is omitted. A first liquid resin 48 is provided in the image display area 10 of the first substrate 12. The first liquid resin 48 is a material for forming the first alignment film 20. The first liquid resin 48 may be provided by printing such as screen printing.

As shown in FIG. 4B, the first liquid resin 48 flows from the image display area 10 toward the direction of the bank 22. Since the bank 22 is such that the slope of the inside surface 32 standing from the inner peripheral lower end on the side of the image display area 10 is steep, the fluidity of the first liquid resin 48 on the inside surface 32 is low. Accordingly, the first liquid resin 48 is dammed by the bank 22 and the first alignment film 20 can be formed.

As shown in FIG. 4C, a second liquid resin 50 is provided outside the bank 22 of the first substrate 12. The second liquid resin 50 is a material for forming the sealing member 46.

As shown in FIG. 4D, the second liquid resin 50 flows from the outside of the bank 22 toward the direction of the bank 22. In the bank 22, the slope of the outside surface 34 standing from the outer peripheral lower end on the side of the image display area 10 is gentle. Thus, the fluidity of the second liquid resin 50 on the outside surface 34 is high. Accordingly, the second liquid resin 50 is not dammed but flows, and is placed on the bank 22. In this way, the second liquid resin 50 is spread in the inside direction and the sealing member 46 can be formed.

Thereafter, as shown in FIG. 2, the liquid crystal material 42 is sealed in the space between the first alignment film 20 of the first substrate 12 and the second alignment film 40 of the second substrate 36 and surrounded by the sealing member 46.

While there have been described what are at present considered to be certain embodiments of the invention, it will be understood that various modifications maybe made thereto, and it is intended that the appended claims cover all such modifications as fall within the true spirit and scope of the invention.

What is claimed is:

1. A liquid crystal display device comprising:
   a first substrate including an image display area;
   a bank provided on the first substrate and surrounding the image display area;
   a first alignment film provided on the first substrate;
   a second substrate;
   a second alignment film provided on the second substrate;
   a liquid crystal material sandwiched between the first alignment film and the second alignment film; and
   a sealing member to seal the liquid crystal material between the first alignment film and the second alignment film, wherein
   the bank has a shape in which a slope of an inside surface standing from an inner peripheral lower end on a side of the image display area is steeper than a slope of an outside surface standing from an outer peripheral lower end on an opposite side to the image display area,
   the first alignment film contacts the inside surface of the bank and is provided in the image display area, and
   the sealing member passes over the outside surface of the bank in a direction toward the inside surface and overlaps the bank.

2. The liquid crystal display device according to claim 1, wherein a difference in height of the inside surface of the bank is larger than that of the outside surface.

3. The liquid crystal display device according to claim 2, wherein the in side surface is step-shaped.

4. The liquid crystal di splay device according to claim 1, wherein
   the bank includes a plurality of banks, in which a bank having a small outer periphery is positioned in side a bank having a large outer periphery,
   the first alignment film contacts at least the inside surface of the smallest bank, and
   the sealing member passes over at least the outside surface of the largest bank.

5. The liquid crystal display device according to claim 1, wherein the sealing member over laps the first alignment film over the bank.

6. The liquid crystal display device according to claim 1, wherein the bank includes a protruding part provided on a surface of a layer provided on the first substrate.

7. The liquid crystal di splay device according to claim 6, wherein the protruding part is provided along a surface shape of an underlayer disposed under the layer.

8. The liquid crystal display device according t o claim 7, wherein
   colored layers of plural colors are provided on the first substrate,
   the colored layers of plural colors constitute a color filter in the image display area, and
   at least one of the colored layers of plural colors constitutes the underlayer.

9. The liquid crystal display device according to claim 8, wherein two or more layers of the colored layers of plural colors overlap each other to constitute the underlayer.

10. The liquid crystal display device according to claim 9, wherein
    two layers including a first layer and a second layer of the colored layers of plural colors overlap each other to constitute the underlayer, and
    the first layer is disposed to be placed on an outside area of an outer peripheral end part from a portion on the outer peripheral end part of the second layer on an opposite side to the image display area except for a portion on an inner peripheral end part of the second layer on a side of the image display area.

11. The liquid crystal display device according to claim 1, wherein the sealing member is in direct contact with at least a portion of the first alignment film.

12. The liquid crystal display device according to claim 1, wherein the first alignment film extends along an entirety of the inside surface of the bank.

13. The liquid crystal display device according to claim 1, wherein the sealing member separates the bank from the liquid crystal material.

14. The liquid crystal display device according to claim 1, wherein the sealing member is between the bank and the second alignment film.

15. A manufacturing method of a liquid crystal display device comprising the steps of:
    forming a first alignment film of a first liquid resin in an image display area of a first substrate on which a bank is formed to surround the image display area;
    proving a sealing member of a second liquid resin on an outside of the bank of the first substrate; and
    sealing a liquid crystal material in a space between the first alignment film on the first substrate and a second alignment film on a second substrate and surrounded by the sealing member, wherein
    in the step of forming the first alignment film, the first liquid resin flows from the image display area toward a direction of the bank,
    in the step of providing the sealing member, the second liquid resin flows from the outside of the bank towards a direction of the bank,
    the bank has a shape in which a slope of an inside surface standing from an inner peripheral lower end on a side of the image display area is steeper than a slope of an outside surface standing from an outer peripheral lower end on an opposite side to the image display area, and
    fluidity of the first liquid resin on the inside surface is lower than fluidity of the second liquid resin on the outside surface.

16. The manufacturing method of the liquid crystal display device according to claim 15, wherein in the step of forming the first alignment film, the first liquid resin is provided by printing.

* * * * *